United States Patent
Huang et al.

(10) Patent No.: US 11,017,220 B2
(45) Date of Patent: May 25, 2021

(54) CLASSIFICATION MODEL TRAINING METHOD, SERVER, AND STORAGE MEDIUM

(71) Applicant: Tencent Technology (Shenzhen) Company Limited, Guangdong (CN)

(72) Inventors: Fei Huang, Shenzhen (CN); Lin Ma, Shenzhen (CN); Wei Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 78 days.

(21) Appl. No.: 16/696,361

(22) Filed: Nov. 26, 2019

(65) Prior Publication Data

US 2020/0097709 A1 Mar. 26, 2020

Related U.S. Application Data

(63) Continuation of application No. PCT/CN2018/117158, filed on Nov. 23, 2018.

(30) Foreign Application Priority Data

Dec. 12, 2017 (CN) .......................... 201711322612.2

(51) Int. Cl.
*G06K 9/00* (2006.01)
*G06N 20/00* (2019.01)
*G06K 9/62* (2006.01)

(52) U.S. Cl.
CPC ....... *G06K 9/00409* (2013.01); *G06K 9/6256* (2013.01); *G06K 9/6267* (2013.01); *G06N 20/00* (2019.01)

(58) Field of Classification Search
CPC ............. G06K 9/00409; G06K 9/6256; G06K 9/6267; G06K 9/6265; G06K 9/00422;
(Continued)

(56) References Cited

U.S. PATENT DOCUMENTS

| 9,064,147 | B2 | 6/2015 | Ouyang et al. |
| 2010/0164877 | A1* | 7/2010 | Yu .......................... G06F 3/0488 345/173 |

(Continued)

FOREIGN PATENT DOCUMENTS

| CN | 106126581 A | 11/2016 |
| CN | 106250866 A | 12/2016 |

(Continued)

OTHER PUBLICATIONS

Chinese International Search Report for corresponding PCT Application No. PCT/CN2018/117158 dated Feb. 25, 2019.

*Primary Examiner* — Juan A Torres
(74) *Attorney, Agent, or Firm* — Brinks Gilson & Lione

(57) ABSTRACT

A classification model training method is provided. The method includes selecting a training dataset, determining a category of a sketch in the training dataset according to a sketch classification model, to obtain a first category processing result, and analyzing, according to a second feature analysis model, a feature of the sketch extracted by a first feature extracting model, to obtain a second analysis result of the sketch; then obtaining a function value of a first loss function according to the first category processing result and the second analysis result of the sketch; and finally adjusting a first model parameter value of the sketch classification model according to the function value of the first loss function.

20 Claims, 7 Drawing Sheets

(58) Field of Classification Search
CPC .............. G06K 9/6292; G06K 9/00456; G06K 9/6269; G06N 20/00; G06N 3/0454; G06N 3/08; G06N 20/10
USPC .......................................................... 382/157
See application file for complete search history.

(56) References Cited

U.S. PATENT DOCUMENTS

| | | | | |
|---|---|---|---|---|
| 2012/0141032 | A1* | 6/2012 | Ouyang | G06K 9/00422 382/187 |
| 2012/0166382 | A1* | 6/2012 | Aggarwal | G06N 20/00 706/53 |

FOREIGN PATENT DOCUMENTS

| | | |
|---|---|---|
| CN | 106683048 A | 5/2017 |
| CN | 107122396 A | 9/2017 |
| CN | 107220277 A | 9/2017 |
| CN | 108090508 A | 5/2018 |

* cited by examiner

CLASSIFICATION MODEL TRAINING METHOD, SERVER, AND STORAGE MEDIUM

RELATED APPLICATION

This application is a continuation application of and claims priority to PCT International Application No. PCT/CN2018/117158 entitled "CLASSIFICATION MODEL TRAINING METHOD SERVER, AND STORAGE MEDIUM" and filed with the China National Intellectual Property Administration on Nov. 23, 2018, which claims priority to Chinese Patent Application No. 201711322612.2, entitled "CLASSIFICATION MODEL TRAINING METHOD, SERVER, AND STORAGE MEDIUM" filed with China National Intellectual Property Administration on Dec. 12, 2017, which is incorporated by reference in their entireties.

FIELD OF THE TECHNOLOGY

This application relates to the field of information processing technologies, and in particular, to a classification model training method, a server, and a storage medium.

BACKGROUND OF THE DISCLOSURE

Sketch recognition may be applicable to a plurality of fields, such as early childhood education. Category identification of hand sketches and retrieval of these hand sketches based on their categorization may be of vital importance for the growth of divergent thinking and graph understanding capability of children. Sketch recognition may also be used in another graph retrieval system.

Specifically, a user inputs a hand sketch through a terminal device and transmits the hand sketch to a backend server. The backend server identifies a category of the received hand sketch according to a pre-trained classifier such as a support vector machine (SVM) or a pre-trained classification network. To ensure the accuracy for identifying the hand sketch, it is necessary to ensure the accuracy of the pre-trained classifier or classification network. Therefore, a process of training the classifier or the classification network is important.

In traditional methods, the classifier or the classification network are mainly obtained by training according to a large number of feature information of the sketch whose category has been marked or labeled in advance. However, scarce training samples of sketches may often result in overfitting or underfitting of the trained classifier or classification network, affecting the accuracy of identifying the category of the hand sketch.

SUMMARY

Embodiments of this application provide a classification model training method, a server, and a storage medium.

An embodiment of this application provides a classification model training method, including:

determining, by a server, a sketch classification model, the sketch classification model including a first feature extraction module and a first classification module; and determining a second feature analysis model analyzing an output result of a second feature extraction module, the second feature extraction module being a machine-generated graphics classification model;

selecting, by the server, a training dataset, the training dataset including sketches of a plurality of categories;

determining, by the server, a category of a sketch in the training dataset according to the sketch classification model to obtain a first category processing result; and analyzing, according to the second feature analysis model, a feature of the sketch extracted by the first feature extraction module to obtain a second feature analysis result of the sketch;

calculating, by the server, a function value of a first loss function of the sketch classification model according to the first category processing result and the second feature analysis result of the sketch; and adjusting, by the server, a first model parameter value in the sketch classification model according to the function value of the first loss function.

An embodiment of this application provides one or more storage media. The storage media store computer readable instructions. The computer readable instructions are loaded by a processor to perform the classification model training method according to the embodiment of this application.

An embodiment of this application provides a server, including one or more processors and memories. The memories store computer readable instructions. The one or more processors are configured to implement each computer readable instruction. The computer readable instructions are configured to be loaded by the one or more processors to perform the classification model training method according to the embodiment of this application.

The details of one or more embodiments of this application are disclosed in the following accompanying drawings and descriptions. Other features, objectives, and advantages of this application become clearer based on the specification, the accompanying drawings, and the claims of this application.

BRIEF DESCRIPTION OF THE DRAWINGS

To describe the technical solutions of the embodiments of this application or the existing technology more clearly, the following briefly introduces the accompanying drawings for describing the embodiments of this disclosure. The accompanying drawings in the following description are merely exemplary, and a person of ordinary skill in the art may still derive other drawings from these accompanying drawings without creative efforts.

DESCRIPTION OF EMBODIMENTS

Figure 1:
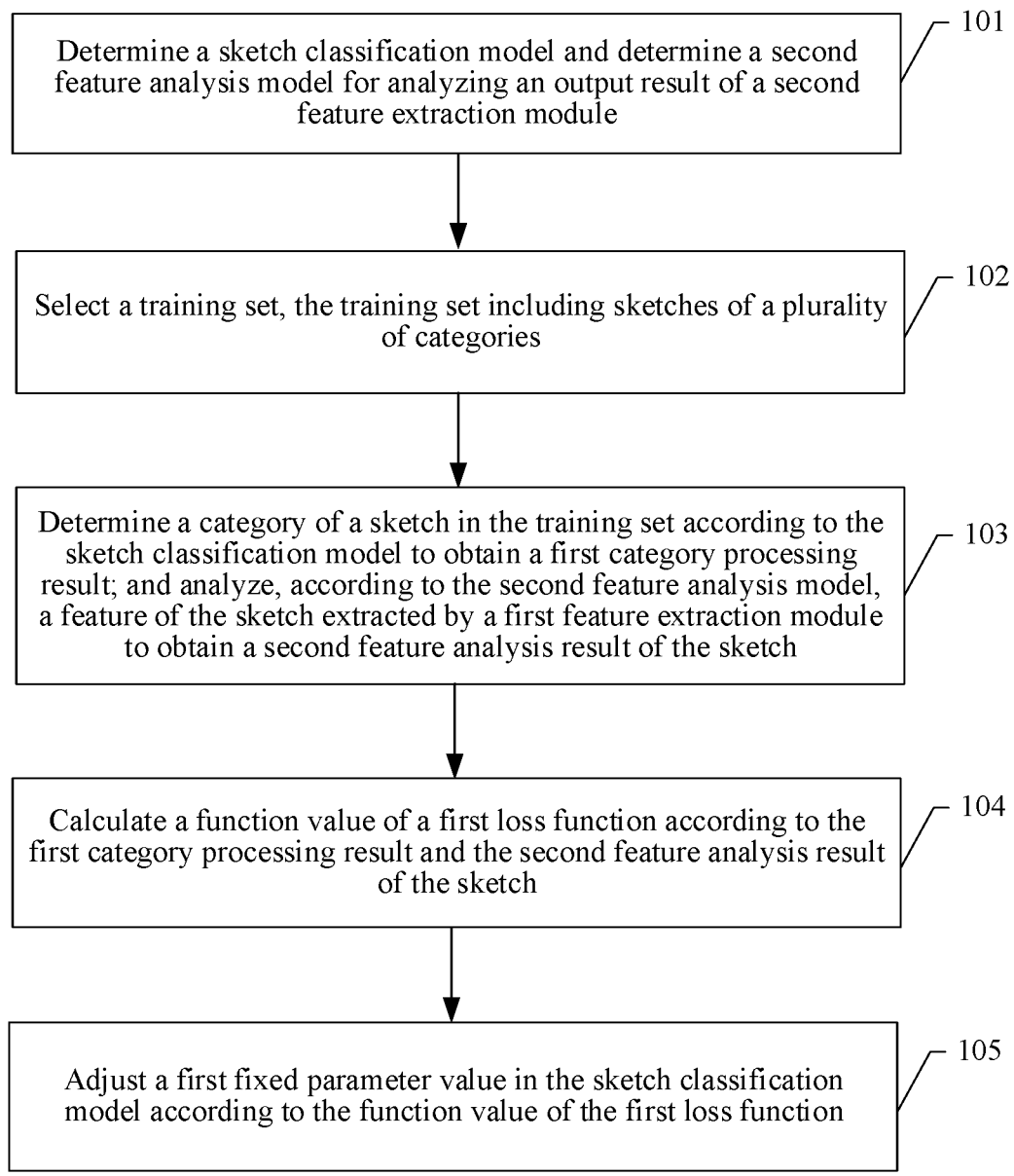
FIG. 1 is a flowchart of a classification model training method according to an embodiment of this application.

The following describes the technical solutions in the embodiments of this application with reference to the accompanying drawings in the embodiments of this application. The embodiments described below are only examples. Other embodiments derived by a person of ordinary skill in the art based on the embodiments of this application without creative efforts shall fall within the protection scope of this application.

The terms "first", "second", "third", "fourth" and the like (if exist) used in the specification, claims, and accompanying drawings of this application are configured to distinguish similar objects but are not necessarily configured to describe a specific sequence or a precedence. It is to be understood that the data used in such a manner may be exchanged in a proper situation. Therefore, the embodiments of this application described herein may be, for example, implemented in other sequences than the sequences illustrated or described herein. In addition, the terms "include", "have" and any variants thereof are intended to cover a non-exclusive inclusion. For example, in a context of a process, method, system, product, or device that includes a series of steps or units are not necessarily limited to the steps or units that are expressly specified, but may include other steps or units not specified expressly or may include the inherent steps or units of the process, method, product, or device.

An embodiment of this application provides a classification model training method. In the method, training is performed mainly based on a hand sketch (referred to as "sketch" for simplicity) whose category has been marked (alternatively referred to as "labeled") and a machine-generated graphics (alternatively referred to as "machine-generated image" or "real image" or "real graph" below) whose category has been marked, to obtain a sketch classification model and a machine-generated graphics classification model. Specifically, in this embodiment, a classification model training apparatus performs training through the following method:

determining the sketch classification model, the sketch classification model including a first feature extraction module and a first classification module, and determining a second feature analysis model for analyzing an output result of a second feature extraction module, the second feature extraction module belonging to a machine-generated graphics classification model; selecting a training dataset, the training dataset including sketches of a plurality of categories; determining a category of a sketch in the training dataset according to the sketch classification model to obtain a first category processing result, and analyzing, according to the second feature analysis model, a feature of the sketch extracted by the first feature extraction module to obtain a second feature analysis result of the sketch; calculating a function value of a first loss function of the sketch classification model according to the first category processing result and the second feature analysis result of the sketch; and adjusting a first model parameter value in the sketch classification model according to the function value of the first loss function.

Further, the sketch classification model and the machine-generated graphics classification model obtained by training may be applicable but are not limited to the following scenarios: a user may input a hand sketch through a terminal device and transmits the hand sketch to a backend server; the backend server determines, through a pre-trained sketch classification model, a category of the hand sketch received by the backend server; and the backend server may retrieve a real image corresponding to the hand sketch according to the pre-trained sketch classification model and the machine-generated graphics classification model.

In this way, reference will be made to not only a deviation for the classification model to classify a corresponding image, but also useful information of another classification model (such as a machine-generated graphics classification model) in a classification process when model parameter values of a certain classification model (such as the sketch classification model) is adjusted, that is, a feature analysis model (such as the second feature analysis model) analyzing a feature extracted by the feature extraction module in another classification model, to ensure more accurate classification calculation of the sketch classification model and the machine-generated graphics classification model after the adjustment.

Figure 2:
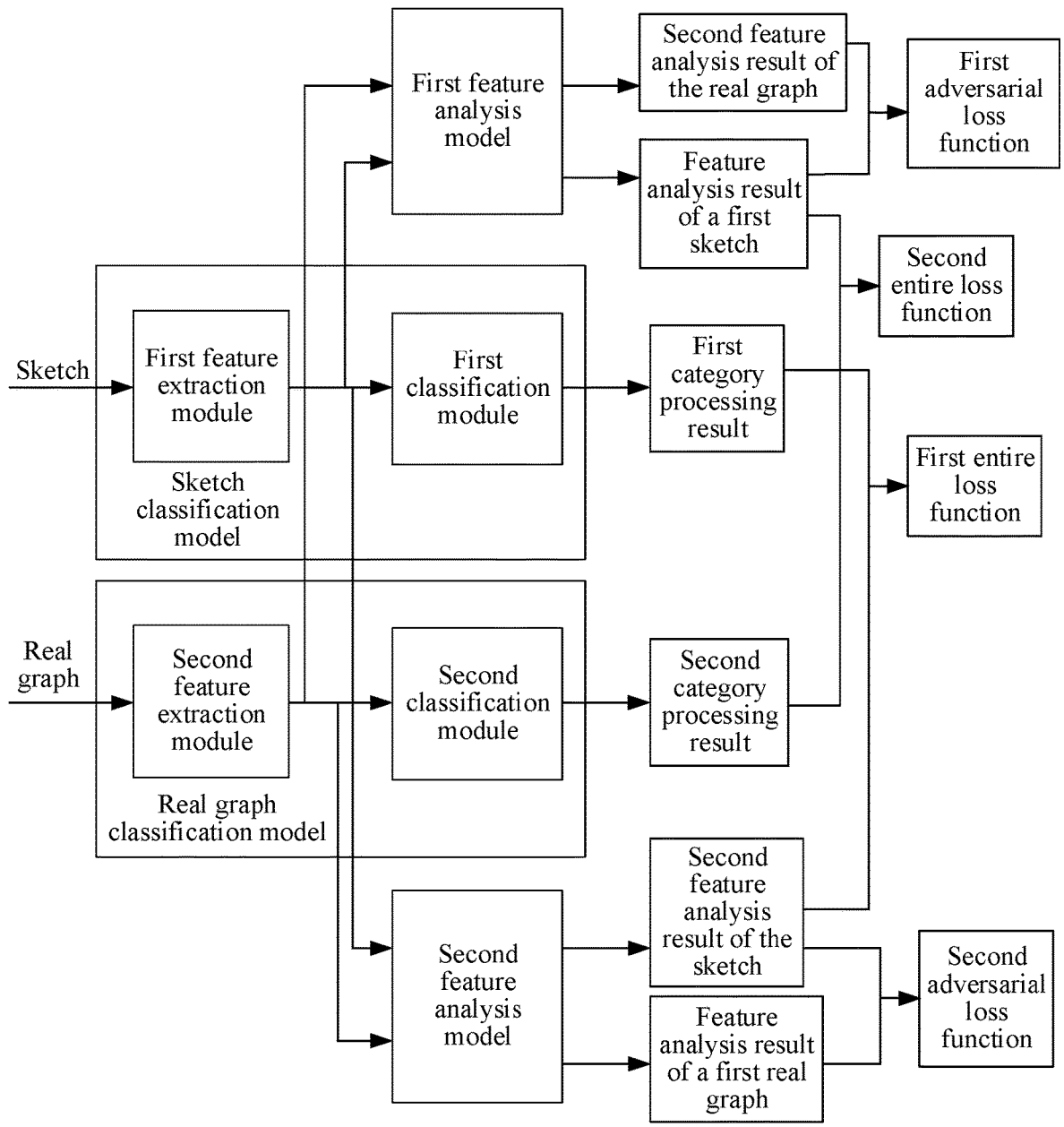
FIG. 2 is a schematic diagram of calculating a function value of each loss function according to an embodiment of this application.

An embodiment of this application provides a classification model training method. The classification model training method is executed by a classification model training apparatus. The flowchart is shown in FIG. 1, and the schematic diagram is shown in FIG. 2. The method includes the following steps.

Step 101. Determine a sketch classification model, the sketch classification model including a first feature extraction module and a first classification module; and determine a second feature analysis model analyzing an output result of a second feature extraction module, the second feature extraction module being a machine-generated graphics classification model;

The sketch classification model is configured to identify a category of a sketch. The sketch (or hand sketch) is an image drawn by a user through an electronic device, an image drawn by a user manually, or the like. Specifically, the sketch classification model usually includes a first feature extraction module extracting a feature of a sketch and a first classification module performing classification according to the extracted feature of the sketch, such as a convolutional-neural-network-based classification model or a classification model such as a support vector machine (SVM). In this embodiment, the determining, by a classification model training apparatus, the sketch classification model specifically includes determining a structure of the sketch classification model and corresponding parameter values for model parameters. The structure of the sketch classification model specifically includes the first feature extraction module and a structure of the first classification module. The corresponding parameter values specifically includes parameter values of model parameters for the first feature extraction module and parameter values of parameters for the first classification module.

The machine-generated graphics classification model is configured to identify a category of a machine-generated graphics. The machine-generated graphics is an image of an entity obtained by a camera or a webcam. Specifically, the machine-generated graphics classification model usually includes a second feature extraction module extracting a feature of the machine-generated graphics and a second classification module performing classification according to the extracted feature of the machine-generated graphics. The second classification module may include, for example, a convolutional-neural-network-based classification model or a classification model such as SVM. The second feature analysis model is configured to analyze the feature (that is, an output result) of the machine-generated graphics extracted by the second feature extraction module in a process by which the machine-generated graphics classification model identifies a category of the machine-generated graphics. Specifically, the feature of the machine-generated graphics may be determined as belonging to the machine-generated graphics. The determining, by the classification model training apparatus, the second feature analysis model specifically includes determining a structure of the second feature analysis model and parameter values of model parameters used by the second feature analysis model in a calculating process.

In this embodiment, a structure of the sketch classification model may be the same as or different from that of the machine-generated graphics classification model. Parameter values of model parameters of each calculating sub-module that forms the sketch classification model is different from parameter values model parameter values of model parameters of each calculation sub-module that forms the machine-generated graphics classification model even if the structure of the sketch classification model is the same as that of the machine-generated graphics classification model. The model parameters herein refers to parameters that are trained and used in a prediction process and that does not need to be assigned with a value at any time, such as a weight and an angle.

Figure 3:
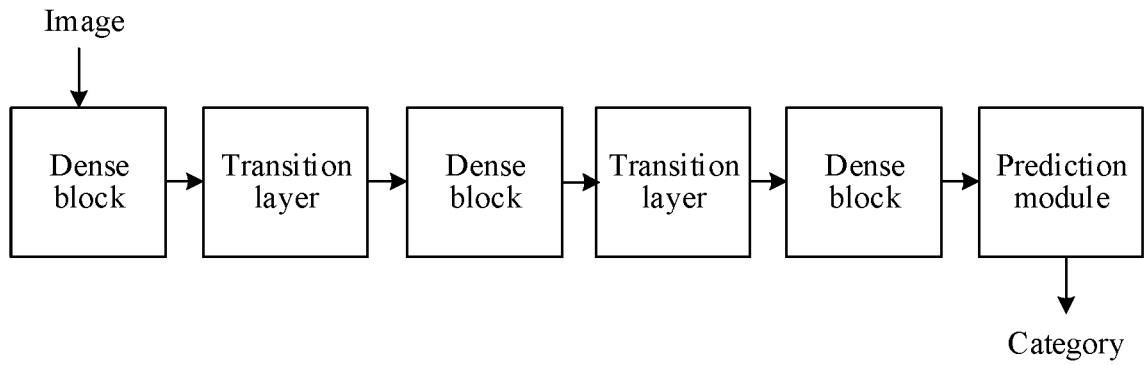
FIG. 3 is a schematic diagram of a sketch classification model and a machine-generated graphics classification model according to an embodiment of this application.

For example, as shown in FIG. 3, both the sketch classification model and the machine-generated graphics classification model may include a dense net model (or deep net model) and include a same quantity of dense blocks and prediction modules. In FIG. 3, description is provided by using an example in which there are three dense blocks. The dense blocks are connected in series through transition layers. The dense blocks and the transition layers belong to the feature extraction module. Each dense block performs convolution calculation and outputs a certain quantity of feature maps. The transition layers connected to the dense blocks may perform dimension reduction on a dimension of the feature maps outputted by the corresponding dense blocks. The prediction module mainly maps the extracted feature to a category probability distribution of a fixed dimension after running through a plurality of dense blocks and a plurality of transition layers, and predicts that a category of a certain image belongs to the classification module. However, model parameters of the dense blocks between the sketch classification model and the machine-generated graphics classification model, such as quantities of the outputted feature maps and sizes of convolution kernels, may be different. Model parameters of the transition layers, such as dimension reduction multiples, may also be different.

It may be understood that in a case, the classification model training apparatus may obtain a pre-trained sketch classification model and machine-generated graphics classification model in some systems when performing this step and may initiate to perform step 102 to step 105 of this embodiment.

In another case, the classification model training apparatus may perform training according to a sketch whose category has been marked to obtain the sketch classification model and perform training according to a machine-generated graphics whose category has been marked to obtain the machine-generated graphics classification model when performing this step. For a currently-trained sketch classification model and machine-generated graphics classification model, the classification model training apparatus initiates to perform step 102 to step 105 of this embodiment.

In this case, the classification model training apparatus may perform training through a loss function related to an initial model of each category to obtain the sketch classification model and the machine-generated graphics classification model when performing this step. Specifically: an initial model of a sketch classification and an initial model of a machine-generated graphics classification are first determined, and the sketch whose category has been marked and the machine-generated graphics whose category has been marked are determined. The determining an initial model of a sketch classification is specifically determining a structure of the initial model of the sketch classification and an initial value of the model parameters. The determining an initial model of a machine-generated graphics classification is specifically determining a structure of the initial model of the machine-generated graphics classification and an initial value of the model parameters.

Then a category of the sketch whose category has been marked is determined according to the initial model of the sketch classification, and a category of the machine-generated graphics whose category has been marked is determined according to the initial model of the machine-generated graphics classification, to obtain an initial classification result. The initial classification result may include an initial category of the sketch whose category has been marked and an initial category of the machine-generated graphics whose category has been marked.

A function value of a third loss function related to the initial model of the sketch classification and a function value of a fourth loss function related to the initial model of the machine-generated graphics classification are calculated according to the initial classification result. Finally, the initial model of the sketch classification is adjusted according to the function value of the third loss function and model parameter values in the initial model of the machine-generated graphics classification is adjusted according to the function value of the fourth loss function, to obtain the sketch classification model and the machine-generated graphics classification model.

Step 102. Select a training dataset. The training dataset may not only include sketches of a plurality of categories, but also include machine-generated graphics of the categories. To be specific, the training dataset may include sketches and machine-generated graphics of a plurality of categories. Each category may correspond to a plurality of sketches and a plurality of machine-generated graphics. Each image in the training dataset has the following marks: the mark of the sketch or the mark of the machine-generated graphics, and the mark of a category corresponding to the image.

The classification model training apparatus may first perform preprocessing on each image in the training dataset after selecting the training dataset, and then perform step 103. The preprocessing process may include: performing zooming or clipping on each image, so that the sizes of processed images are the same. In this way, calculation performed when the categories of the images are determined in step 103 can be simplified.

The preprocessing process may further include: enhancing a main image of each image, so that the main image in each image is clearer and not fuzzy. In this way, when step 103 is performed, the effect of the unclear main image on the process of determining a category of the image is reduced. The main image herein is a major image in one image, rather than a background image, such as a figure and an entity included in one image. There may further be other preprocessing, and any prepossessing method that can reduce the effect on the process of determining, by the classification model training apparatus, the category of the image in step 103 falls within the scope of this embodiment of this application, and this is not exemplified herein one by one.

step 103. Determine the category of the sketch in the training dataset according to the sketch classification model determined in step 101 to obtain a first category processing result. According to a second feature analysis model, a feature of a sketch extracted by the first feature extraction module in the sketch classification model is analyzed in a process in which the sketch classification model determines the category of the sketch, to obtain a second feature analysis result of the sketch. Analyzing the feature of the sketch may include determining whether the feature of the sketch belongs to the sketch. In another embodiment, there may further be other analysis processing, and this is not exemplified herein one by one.

The first category processing result obtained herein may specifically include the categories of sketches in the training dataset and that are determined by the sketch classification model. For example, the training dataset selected in step 102 includes n sketches. The sketches may be sketches of categories of "plane", "tree", and the like. The categories of the n sketches are respectively determined according to the sketch classification model to obtain categories C1, C2, . . . , Cn of the n sketches.

The second feature analysis result of the sketch may specifically include a result of determining, by the second feature analysis model, whether the feature of the sketch extracted by the first feature extraction module belongs to the sketch.

Step 104. Calculate a function value of a first loss function of the sketch classification model according to the first category processing result and the second feature analysis result of the sketch that are obtained in step 103.

The first loss function includes a loss function related to the first classification module and a loss function by which the second feature analysis model analyzes the feature of the sketch.

The loss function related to the first classification module may be obtained according to the first category processing result, and may be specifically a cross-entropy loss function, configured to indicate a difference or deviation between the category determined by the first classification module and an actual category of the sketch.

In another case, if the first classification module uses a method of sorting similar features in the process of determining the category of the sketch, the loss function related to the first classification module may also be a sorting loss function, configured to indicate a loss function in a process of sorting similar features. For example, the first classification module determines that a feature similarity between a sketch 1 and a sketch 2 is greater than a feature similarity between the sketch 1 and the sketch 2 in a process of determining a category of the sketch 1, and then determines that categories of the sketch 1 and the sketch 2 are the same. The sorting loss function may indicate a difference between a sort determined in the process of sorting the feature similarity and a sort of an actual feature similarity.

The loss function by which the second feature analysis model analyzes the feature of the sketch is obtained according to the second feature analysis result of the sketch and is configured to indicate a difference between an analysis result obtained by analyzing using the second feature analysis model the feature of the sketch extracted by the first feature extraction module and an actual feature of the sketch.

Step 105. Adjust first model parameter values in the sketch classification model according to the function value of the first loss function.

The first model parameters for the first feature extraction module and the first classification module of the sketch classification model may include model parameters such as weight and angle parameters. If the calculated function value of the first loss function is relatively large, for example, greater than a preset value, it is necessary to change the first model parameter values, for example, increase a weight value of a certain weight or reduce an angle value of a certain angle, to reduce a function value of a first loss function calculated according to first model parameter value after the adjustment.

There is no absolute sequence relationship between step 101 and step 102. Step 101 and step 102 may be performed at the same time or in sequence. FIG. 1 shows only one specific implementation.

Further, referring to FIG. 2, the classification model training apparatus may further adjust model parameter values in the second feature analysis model. Specifically, the classification model training apparatus determines the machine-generated graphics classification model, specifically including determining a structure of the sketch classification model and corresponding model parameters. The machine-generated graphics classification model includes the second feature extraction module and the second classification module. The classification model training apparatus analyzes, according to the second feature analysis model, the feature of the machine-generated graphics extracted by the second feature extraction module in a process of determining, by the machine-generated graphics classification model, the category of the machine-generated graphics in the training dataset, to obtain a feature analysis result of a first machine-generated graphics. Then the classification model training apparatus calculates a function value of a second adversarial loss function of the second feature analysis model according to the feature analysis result of the first machine-generated graphics and the second feature analysis result of the sketch, and adjusts model parameter values of the second feature analysis model according to the function value of the second adversarial loss function, to reduce or minimize the function value of the second adversarial loss function calculated according to model parameter values of the second feature analysis model after the adjustment.

The feature analysis result of the first machine-generated graphics may specifically include the result of determining, by the second feature analysis model, whether the feature of the machine-generated graphics extracted by the second feature extraction module belongs to the machine-generated graphics. The second adversarial loss function may include a loss from the second feature analysis model in analyzing the feature of the machine-generated graphics and a loss from the second feature analysis model in analyzing the feature of the sketch. The loss from the second feature analysis model in analyzing the feature of the machine-generated graphics may be obtained according to the feature analysis result of the first machine-generated graphics. The loss from the second feature analysis model in analyzing the feature of the sketch may be obtained according to the second feature analysis result of the sketch. The loss function from the second feature analysis model in analyzing the feature of the machine-generated graphics is configured to indicate a difference between an analysis result obtained by analyzing, by the second feature analysis model, the feature of the machine-generated graphics extracted by the second feature extraction module and an actual feature of the machine-generated graphics.

In addition, step 103 to step 105 include processes of adjusting, by the classification model training apparatus, the first model parameter values after the sketch classification model determined in step 101 separately processes each sketch in the training dataset. However, in actual applications, it is necessary to perform step 103 to step 105 continuously and iteratively, until the adjustment on the first model parameter values meets a certain stopping condition.

Therefore, the classification model training apparatus further needs to determine whether the current adjustment on the first model parameter values meets a preset stopping condition after performing step 103 to 105 of the foregoing embodiment. If yes, the procedure ends; and otherwise, for the sketch classification model whose first model parameter values are adjusted, return to operations of step 103 to step 105. To be specific, the operations of obtaining the first category processing result and the second feature analysis result of the sketch, calculating the function value of the first loss function of the sketch classification model, and adjusting the first model parameter values are performed.

The preset stopping condition includes but is not limited to any one of the following conditions: a first difference between first model parameter values currently adjusted and first model parameter values adjusted last time is less than a first threshold, that is, the adjusted first model parameter values achieve convergence; the number of adjustment times of the first model parameter values reaches the preset number of times, and the like. It may be understood that the stopping condition herein is a condition of stopping adjusting the first model parameter values.

Figure 4:
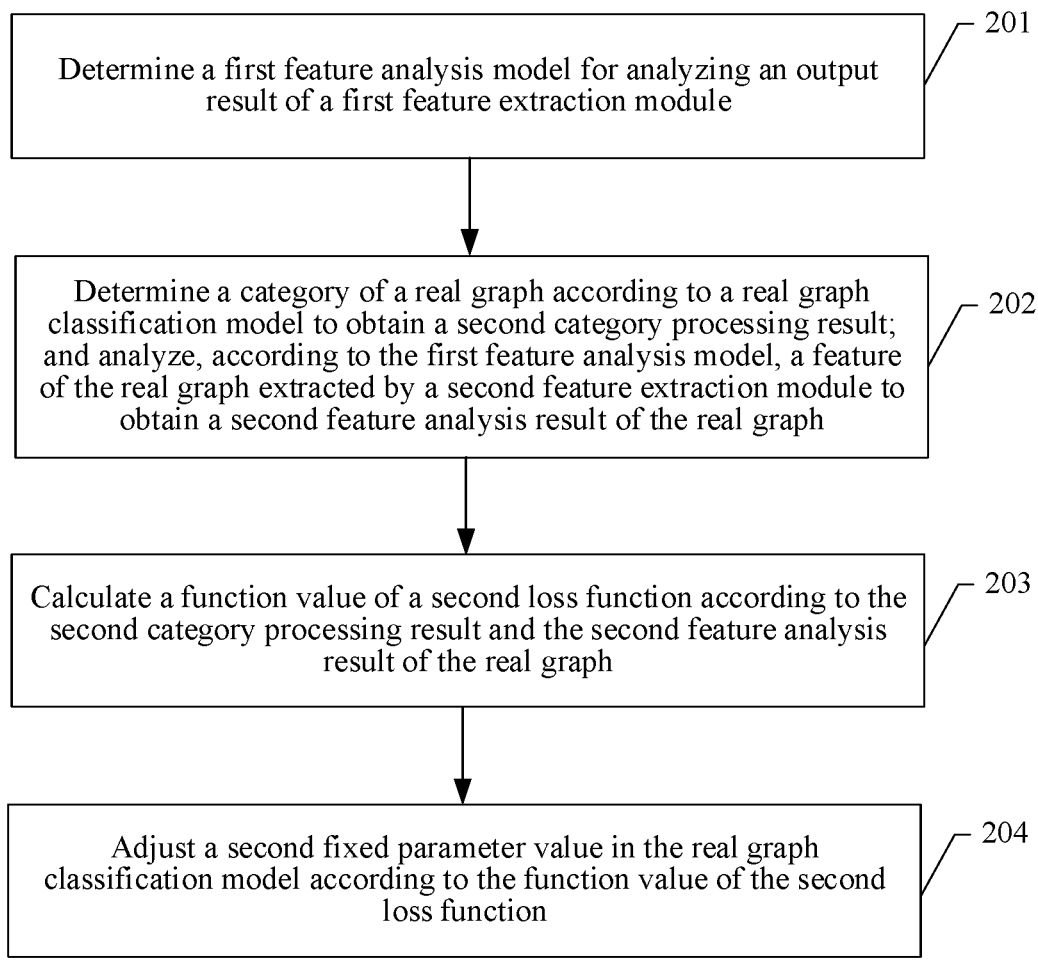
FIG. 4 is a flowchart of another classification model training method according to an embodiment of this application.

Further, the classification model training apparatus may further adjust second model parameter values of the machine-generated graphics classification model through the following steps. The flowchart is shown in FIG. 4 and the schematic diagram is shown in FIG. 2. The following steps are included.

Step 201. Determine the first feature analysis model for analyzing an output result of the first feature extraction module.

The first feature analysis model is configured to analyze the feature (that is, an output result) of the sketch extracted by the first feature extraction module in the process of identifying, by the sketch classification model, the category of the sketch. Specifically, the feature of the sketch may be determined as belonging to the sketch.

Step 202. Determine the category of the machine-generated graphics in the training dataset according to the machine-generated graphics classification model to obtain a second category processing result; and analyze, according to the first feature analysis model, a feature of the machine-generated graphics extracted by the second feature extraction module to obtain a second feature analysis result of the machine-generated graphics.

The second category processing result obtained herein may specifically include categories of the machine-generated graphics in the training dataset and that are determined by the machine-generated graphics classification model. The second feature analysis result of the machine-generated graphics may specifically include a result of determining, by the first feature analysis model, whether the feature of the machine-generated graphics extracted by the second feature extraction module belongs to the machine-generated graphics.

Step 203. Calculate a function value of a second loss function of the machine-generated graphics classification model according to the second category processing result and the second feature analysis result of the machine-generated graphics. The second loss function includes a loss function related to the second classification module and a loss function by which the first feature analysis model analyzes the feature of the machine-generated graphics.

The loss function related to the second classification module may be obtained according to the second category processing result. The loss function related to the second classification module may be specifically a cross-entropy loss function, configured to indicate a difference between the category determined by the second classification module and an actual category of the machine-generated graphics. If the second classification module uses a method of sorting similar features in the process of determining the category of the machine-generated graphics, the loss function related to the second classification module may also be a sorting loss function, configured to indicate the loss function in the process of sorting the similar features.

The loss function by which the first feature analysis model analyzes the feature of the machine-generated graphics may be obtained according to the second feature analysis result of the machine-generated graphics and is configured to indicate a difference between an analysis result obtained by analyzing, by the first feature analysis model, the feature of the machine-generated graphics extracted by the second feature extraction module and an actual feature of the machine-generated graphics.

Step 204. Adjust second model parameter values in the machine-generated graphics classification model according to a function value of a second loss function.

The second model parameter of the second feature extraction module and the second classification module that are included in the machine-generated graphics classification model may include parameters such as weight and angle. If the calculated function value of the second loss function is relatively large, for example, greater than a preset value, it is necessary to change the second model parameter values, for example, increase a weight value of a certain weight or reduce an angle value of a certain angle, to reduce the function value of the second loss function calculated according to the second model parameter values after the adjustment.

Further, referring to FIG. 2, the classification model training apparatus may further adjust model parameter values in the first feature analysis model. Specifically, the classification model training apparatus analyzes, according to the first feature analysis model, the feature of the sketch extracted by the first feature extraction module to obtain a first feature analysis result of the sketch, then calculates a loss function of a first adversarial loss function of the first feature analysis model according to the first feature analysis result of the sketch and the second feature analysis result of the machine-generated graphics, and adjusts model parameter values of the first feature analysis model according to the function value of the first adversarial loss function.

The first feature analysis result of the sketch may specifically include a result of determining, by the first feature analysis model, whether the feature of the sketch extracted by the first feature extraction module belongs to the sketch. The first adversarial loss function may include a loss function by which the first feature analysis model analyzes the feature of the machine-generated graphics and a loss function by which the first feature analysis model analyzes the feature of the sketch. The loss function by which the first feature analysis model analyzes the feature of the machine-generated graphics may be obtained according to the second feature analysis result of the machine-generated graphics. The loss function by which the first feature analysis model analyzes the feature of the sketch may be obtained according to the first feature analysis result of the sketch. The loss function by which the first feature analysis model analyzes the feature of the sketch is configured to indicate a difference between an analysis result obtained by analyzing, by the first feature analysis model, the feature of the sketch extracted by the first feature extraction module and an actual feature of the sketch.

In addition, step 202 to step 204 are processes of adjusting, by the classification model training apparatus, the second model parameter values after the machine-generated graphics in the training dataset are processed. However, in actual applications, it is necessary to perform step 202 to step 204 continuously and iteratively, until the adjustment on the second model parameter value meets a certain stopping condition.

Therefore, the classification model training apparatus needs to determine whether the current adjustment on the second model parameter values meets a preset stopping condition after performing step 201 to step 204. If yes, the procedure ends, and otherwise, for a machine-generated graphics classification model whose second model parameter value is adjusted, return to step 202 to step 204. To be specific, operations of obtaining the second category processing result and the second feature analysis result of the machine-generated graphics, calculating the function value of the second loss function of the machine-generated graphics classification model, and adjusting the second model parameter values are performed.

The preset stopping condition includes but is not limited to any one of the following conditions: a first difference between the second model parameter values currently adjusted and the second model parameter values adjusted last time is less than a second threshold, that is, the adjusted second model parameter values achieve convergence; and the number of adjustment times to the second model parameter values reach the preset number of times, and the like.

Step 202 to step 204 may be performed alternately with step 103 to step 105. For example, in an adjusting process, the first model parameter values of the sketch classification model and the model parameter values of the second feature analysis model may be adjusted. That is, step 103 to step 105 are performed. In another adjusting process, the second model parameter values of the machine-generated graphics classification model and the model parameter values of the first feature analysis model are adjusted. That is, step 202 to step 204 are performed. In a readjusting process, the first model parameter values of the sketch classification model and the model parameter values of the second feature analysis model are adjusted again. That is, step 103 to step 105 are performed, and so on.

Further, the classification model training apparatus obtains the sketch classification model and the machine-generated graphics classification model after the adjustment through the methods in the foregoing embodiments. In actual application of the sketch classification model and the machine-generated graphics classification model after the adjustment, in one case, the classification model training apparatus may first obtain a to-be-classified sketch (such as a to-be-classified sketch input by a user through a terminal device), then classifies the to-be-classified sketch according to the sketch classification model after the adjustment, to obtain a category of the to-be-classified sketch, implementing classification of the sketches.

In another case, the classification model training apparatus may first obtain the to-be-classified sketch (such as the to-be-classified sketch input by the user through the terminal device) and obtain each machine-generated graphics stored in the classification model training apparatus; then classify the to-be-classified sketch according to the sketch classification model after the adjustment to obtain a category of the to-be-classified sketch, and separately classify each stored machine-generated graphics according to the machine-generated graphics classification model after the adjustment to obtain categories of the machine-generated graphics; and finally select a machine-generated graphics having a same category as that of the to-be-classified sketch, to provide the machine-generated graphics for the terminal device of the user. In this way, retrieval of the sketch is implemented.

It can be understood that in the method of this embodiment, the classification model training apparatus first selects the training dataset, determines the category of theسketch in the training dataset according to the sketch classification model to obtain the first category processing result, and analyzes, according to the second feature analysis model, the feature of the sketch extracted by a first feature extracting model to obtain the second analysis result of the sketch; then obtains the function value of the first loss function according to the first category processing result and the second analysis result of the sketch; and finally adjusts the first model parameter values of the sketch classification model according to the function value of the first loss function. The classification model training apparatus further determines the category of the machine-generated graphics in the training dataset according to the machine-generated graphics classification model to obtain a second category processing result, and analyzes, according to the first feature analysis model, the feature of the machine-generated graphics extracted by the second feature extraction module to obtain a second analysis result of the machine-generated graphics; then obtains the function value of the second loss function according to the second category processing result and the second analysis result of the machine-generated graphics; and finally adjusts the second model parameter values of the machine-generated graphics classification model according to the function value of the second loss function. In this way, reference will be made to not only a deviation for the classification model to classify a corresponding image, but also useful information of another classification model (such as a machine-generated graphics classification model) in a classification process when model parameter values of a certain classification model (such as the sketch classification model) is adjusted, that is, a feature analysis model (such as the second feature analysis model) analyzing a feature extracted by the feature extraction module in another classification model, to ensure more accurate classification calculation of the sketch classification model and the machine-generated graphics classification model after the adjustment.

Figure 5:
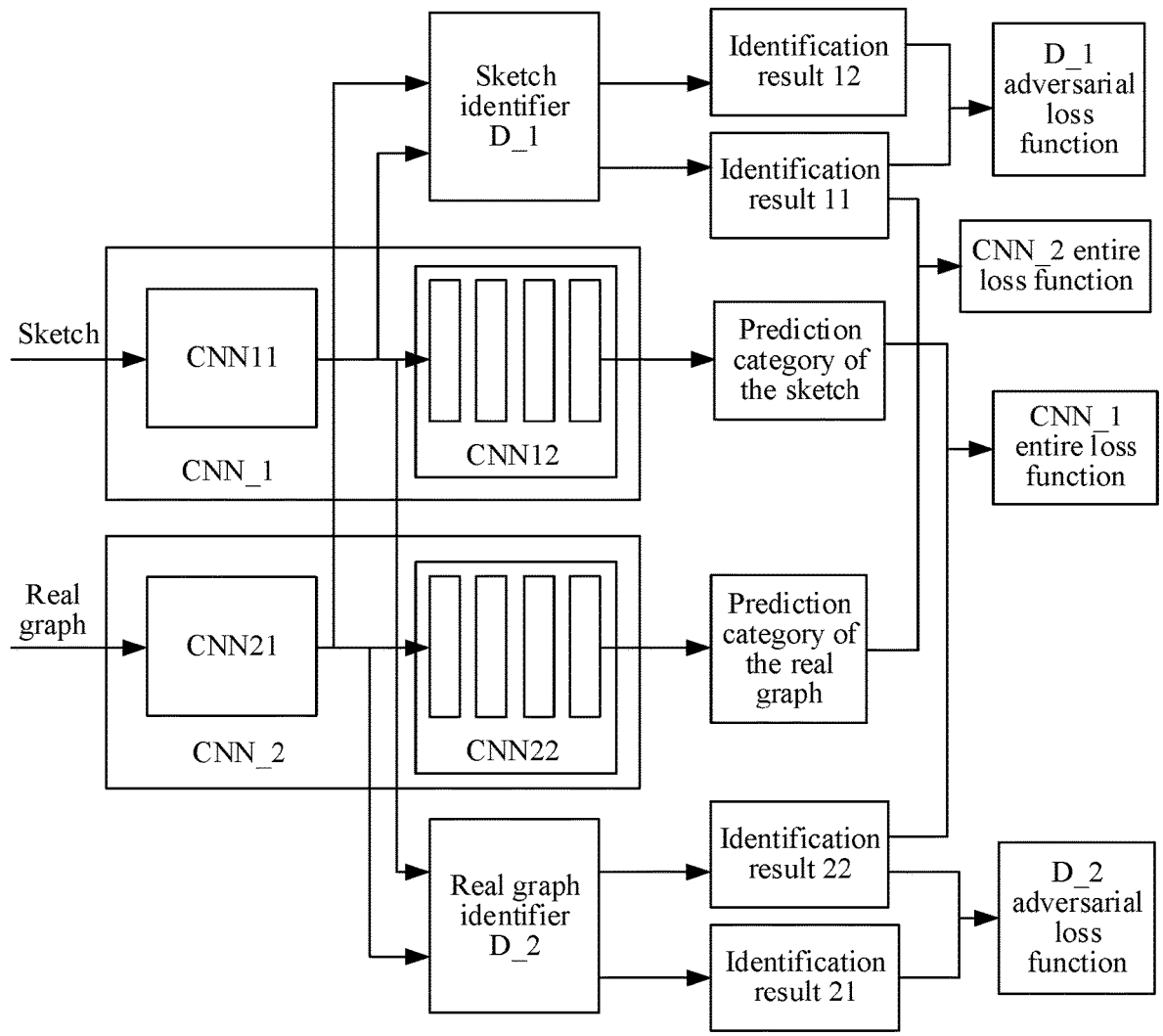
FIG. 5 is a schematic diagram of performing classification by a sketch classification model and a machine-generated graphics classification model according to an application embodiment of this application.
Figure 6:
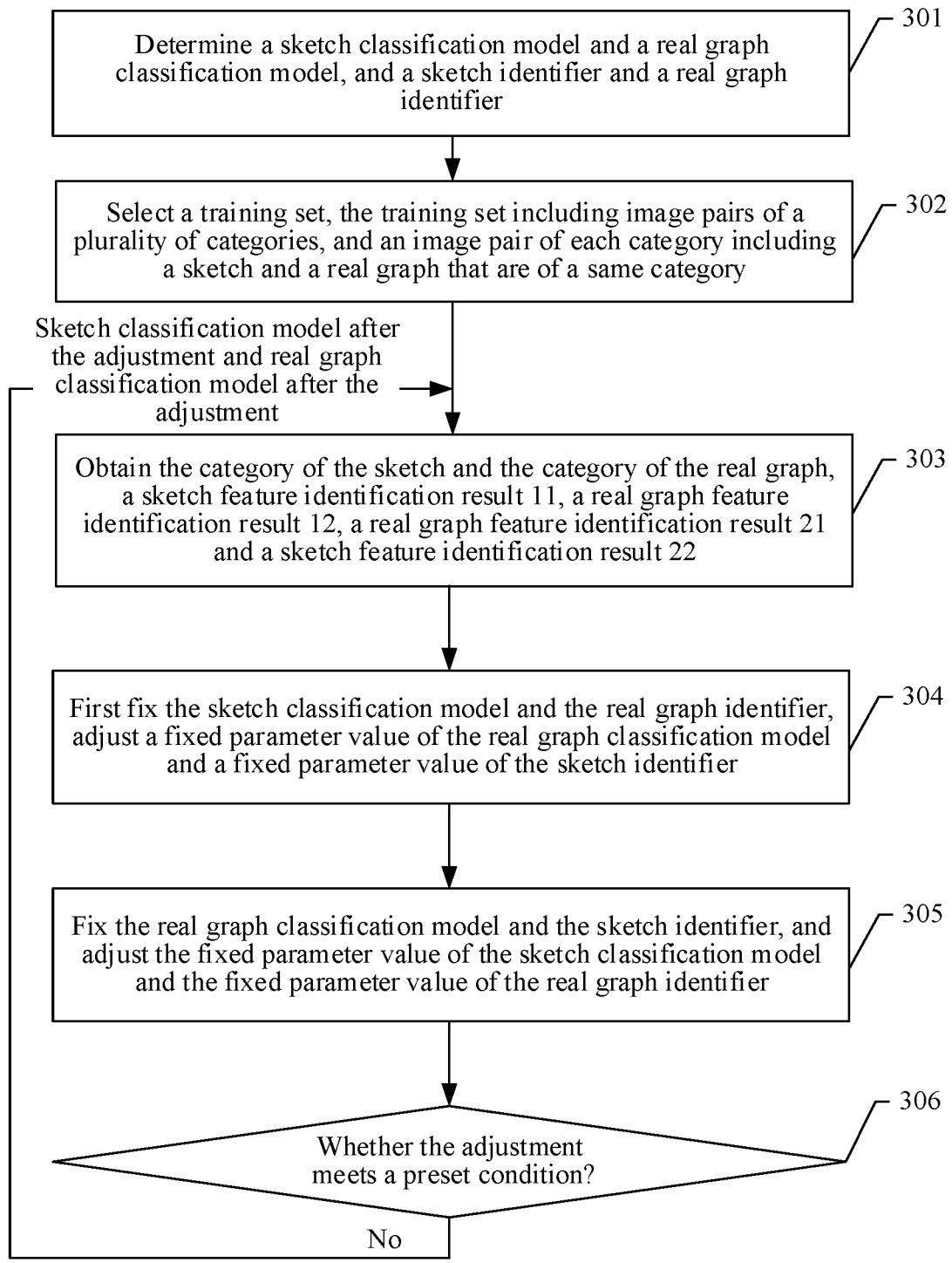
FIG. 6 is a flowchart of a classification model training method according to an application embodiment of this application.

The following specific application example describes the method in this embodiment. Referring to FIG. 5, in this embodiment, the sketch classification model and the machine-generated graphics classification model may use a convolutional-neural-network-based classification model of a same structure and are respectively denoted as CNN_1 and CNN_2. The first feature extraction module and the first classification module that are included in the sketch classification model are respectively noted as CNN11 and CNN12. The first feature analysis model is specifically a sketch identifier D_1. The second feature extraction module and the second classification module that are included in the machine-generated graphics classification model are respectively denoted as CNN21 and CNN22. The second feature analysis model is specifically a machine-generated graphics identifier D_2. The classification model training method of this embodiment may be implemented through the following steps. The flowchart is shown in FIG. 6, including:

Step 301. Determine the sketch classification model CNN_1 and the machine-generated graphics classification model CNN_2, and the sketch identifier D_1 and the machine-generated graphics identifier D_2, specifically including determining a structure of each model and initial values of the model parameters.

Step 302. Select the training dataset. The training dataset includes image pairs of a plurality of categories. The image pair of each category includes sketches and machine-generated graphics of a same category, specifically $(S_i, I_i)|_{i=1}^N$. Si is a sketch image of a category i. Ii is a machine-generated graphics image of the category i.

Step 303. Determine the category of the sketch in the training dataset according to the sketch classification model CNN_1 to obtain the category of the sketch, and determine the category of the machine-generated graphics in the training dataset according to the machine-generated graphics classification model CNN_2 to obtain the category of the machine-generated graphics.

In this process, the sketch identifier D_1 identifies the feature of the sketch extracted by the sketch feature extraction module CNN11 in the sketch classification model CNN_1 to obtain a sketch feature identification result 11. The sketch identifier D_1 identifies the feature of the machine-generated graphics extracted by the machine-generated graphics feature extraction module CNN21 in the machine-generated graphics classification model CNN_2 to obtain a machine-generated graphics feature identification result 12.

The machine-generated graphics identifier D_2 identifies the feature of the machine-generated graphics extracted by the machine-generated graphics feature extraction module CNN21 in the machine-generated graphics classification model CNN_2 to obtain a machine-generated graphics feature identification result 21. The machine-generated graphics identifier D_2 identifies the feature of the sketch extracted by the sketch feature extraction module CNN11 in the sketch classification model CNN_1 to obtain a sketch feature identification result 22.

Step 304. First fix the sketch classification model CNN_1 and the machine-generated graphics identifier D_2, adjust model parameter values of the machine-generated graphics classification model CNN_2 and model parameter values of the sketch identifier D_1, to ensure that the adjustment on the machine-generated graphics classification model CNN_2 refers to useful information of the sketch classification model CNN_1 in the classification process.

Specifically, the classification model training apparatus may calculate a function value of an adversarial function $GL_{S_i}$ of the sketch identifier D_1 according to the following formula (1)-1 encompassing the sketch feature identification result 11 and the machine-generated graphics feature identification result 12 that are obtained in step 303, and adjusts the model parameter values of the sketch identifier D_1 according to the function value to minimize loss $GL_{S_i}$ as indicated in formula (1)-2. as indicated in formula (1)-2

$$GL_{S_i} = \qquad (1)\text{-}1$$
$$-E_{S_i \sim S}[\log D\_1(CNN\_1(S_i))] - E_{I_i \sim I}[\log(1 - D\_1(CNN\_1(I_i)))]$$

$$\min_{D\_1} -E_{S_i \sim S}[\log D\_1(CNN\_1(S_i))] - E_{I_i \sim I}[\log(1 - D\_1(CNN\_2(I_i)))] \qquad (1)\text{-}2$$

A function value of a loss function of the machine-generated graphics classification model CNN_2 is calculated according to the right side of the following formula (2) and the category of the machine-generated graphics and the machine-generated graphics feature identification result 12 that are determined by the machine-generated graphics classification model CNN_2 in step 303. The model parameter values of the machine-generated graphics classification model CNN_2 is adjusted according to minimizing the function value of such a loss function (formula (2)). The loss function related to the machine-generated graphics classification module CNN22 in the machine-generated graphics classification model CNN_2. For example, the loss function to be minimized may include a sum of a cross-entropy loss function $CL_{I_i}$, and a loss function by which the sketch identifier D_1 identifies the feature of the machine-generated graphics may be obtained according to the machine-generated graphics feature identification result 12. The related cross-entropy loss function $CL_{I_i}$ may be obtained according to the following formula 3 and the category of the machine-generated graphics determined by the machine-generated graphics classification model CNN_2 in step 303.

$$\min_{CNN\_2} -E_{I_i \sim I}[\log(D\_1(CNN\_2(I_i))) + CL_{I_i}] \qquad (2)$$

$$CL_{I_i} = -\frac{1}{n} \sum_{d=1...n} [y_i^d \ln(C_I(CNN_{2(I_i)})) + (1 - y_i^d)\ln(1 - C_I(CNN\_2(I_i)))] \qquad (3)$$

wherein $\log(D\_1(CNN\_2(I_i)))$ may indicate a loss function by which the sketch identifier D_1 identifies the feature of the machine-generated graphics.

Step 305. Fix the machine-generated graphics classification model CNN_2 and the sketch identifier D_1 again, adjust model parameter values of the sketch classification model CNN_1 and model parameter values of the machine-generated graphics identifier D_2, to ensure that the adjustment on the sketch classification model CNN_1 refers to useful information of the machine-generated graphics classification model CNN_2 in the classification process.

Specifically, the classification model training apparatus may calculate a function value of an adversarial function $GL_{I_i}$ of the machine-generated graphics identifier D_2 according to the following formula (4)-1 encompassing the machine-generated graphics feature identification result 21 and the sketch feature identification result 22 that are obtained in step 303, and adjusts the model parameter values of the machine-generated graphics identifier D_2 according to the function value to minimize loss $GL_{I_i}$, as indicated in formula (4)-2.

$$GL_{I_i} = \qquad (4)\text{-}1$$
$$-E_{I_i \sim S}[\log D\_2(CNN\_2(I))] - E_{S_i \sim S}[\log(1 - D\_2(CNN\_1(S_i)))]$$

$$\min_{D\_2} -E_{I_i \sim S}[\log D\_2(CNN\_2(I_i))] - E_{S_i \sim S}[\log(1 - D\_2(CNN\_1(S_i)))] \qquad (4)\text{-}2$$

A function value of a loss function of the sketch classification model CNN_1 is calculated according to the right side of the following formula (5) and the category of the sketch and the sketch feature identification result 22 that are determined by the sketch classification model CNN_1 in step 303, and the model parameter values of the sketch classification model CNN_1 is adjusted according to minimizing the loss function value (formula (5)). The function value may specifically include a loss function related to the sketch classification module CNN12 in the sketch classification model CNN_1. For example, the loss function may include a sum of a cross-entropy loss function $CL_{S_i}$ and a loss function by which the machine-generated graphics identifier D_2 identifies the feature of the sketch. The loss function by which the machine-generated graphics identifier D_2 identifies the feature of the sketch may be obtained according to the sketch feature identification result 22. The related loss function $CL_{S_i}$ may be obtained according to the following formula 6 and the category of the sketch.

$$\min_{CNN\_1} -E_{S_i \sim S}[\log(D\_2(CNN\_1(S_i))) + CL_{S_i}] \quad (5)$$

$$CL_{S_i} = \quad (6)$$
$$-\frac{1}{n}\sum_{d=1\ldots n}[y_i^d \ln(C_S(CNN_{1(S_i)})) + (1 - y_i^d)\ln(1 - CNN\_1(F_S(S_i)))]$$

wherein $\log(D\_2(CNN\_1(S_i)))$ may indicate a loss function by which the machine-generated graphics identifier D_2 identifies the feature of the sketch.

Step 306. Determine whether the adjustment on the model parameter values of the sketch classification model CNN_1 and the machine-generated graphics classification model CNN_2 meets a preset condition after performing step 301 to step 305. If yes, the procedure ends, and otherwise, for the sketch classification model CNN_1 and the machine-generated graphics classification model CNN_2 after the adjustment, and the sketch identifier D_1 and the machine-generated graphics identifier D_2 after the adjustment, return to perform step 303 to step 305.

Figure 7:
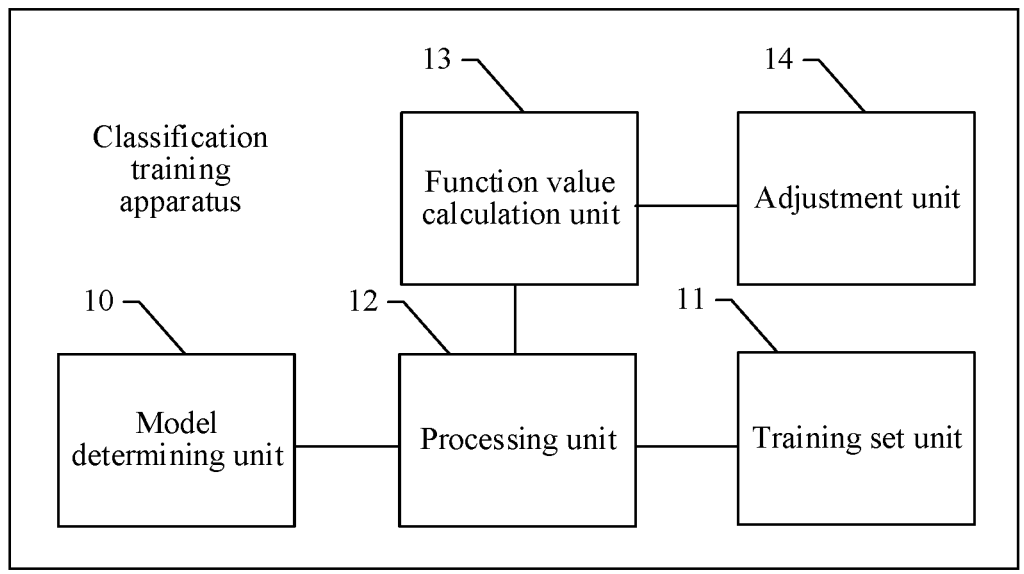
FIG. 7 is a block diagram of a classification model training apparatus according to an embodiment of this application.

An embodiment of this application further provides a classification model training apparatus. A schematic structural diagram of the classification model training apparatus is shown in FIG. 7 and the classification model training apparatus may specifically include:

a model determining unit 10, configured to determine a sketch classification model, the sketch classification model including a first feature extraction module and a first classification module; and determine a second feature analysis model analyzing an output result of a second feature extraction module, the second feature extraction module being a machine-generated graphics classification model.

Specifically, the model determining unit 10 is specifically configured to: determine an initial model of a sketch classification and an initial model of a machine-generated graphics classification that have a same structure and determine a sketch whose category has been marked and a machine-generated graphics whose category has been marked; determine a category of the sketch whose category has been marked according to the initial model of the sketch classification and determine a category of the machine-generated graphics whose category has been marked according to the initial model of the machine-generated graphics classification, to obtain an initial classification result; calculate a function value of a third loss function related to the initial model of the sketch classification and a function value of a fourth loss function related to the initial model of the machine-generated graphics classification according to the initial classification result; and adjust model parameter values in the initial model of the sketch classification according to the function value of the third loss function and adjust model parameter values in the initial model of the machine-generated graphics classification according to the function value of the fourth loss function, to obtain the sketch classification model and the machine-generated graphics classification model. A training dataset unit 11 is configured to select a training dataset. The training dataset includes sketches of a plurality of categories. The training dataset further includes machine-generated graphics of corresponding categories.

A processing unit 12 is configured to: determine, according to the sketch classification model determined by the model determining unit 10, the category of the sketch in the training dataset selected by the training dataset unit 11, to obtain a first category processing result; and analyze, according to the second feature analysis model, a feature of the sketch extracted by the first feature extraction module, to obtain a second feature analysis result of the sketch.

A function value calculation unit 13 is configured to calculate a function value of a first loss function of the sketch classification model according to the first category processing result and the second feature analysis result of the sketch that are obtained by the processing unit 12. The first loss function includes a loss function related to the first classification module and a loss function by which the second feature analysis model analyzes the feature of the sketch.

An adjustment unit 14 is configured to adjust a first model parameter value in the sketch classification model according to the function value of the first loss function calculated by the function value calculation unit 13.

Further, the training dataset selected by the training dataset unit 11 may further include a machine-generated graphics of a corresponding category. The model determining unit 10 may further determine the machine-generated graphics classification model. The machine-generated graphics classification model includes a second feature extraction module and a second classification module. The processing unit 12 is further configured to analyze, according to the second feature analysis model, the feature of the machine-generated graphics extracted by the second feature extraction module when the machine-generated graphics classification model determines the category of the machine-generated graphics, to obtain a feature analysis result of a first machine-generated graphics. The function value calculation unit 13 is further configured to calculate a function value of a second adversarial loss function of the second feature analysis model according to the feature analysis result of the first machine-generated graphics and the second feature analysis result of the sketch. The adjustment unit 14 is further configured to adjust model parameter values of the second feature analysis model according to the function value of the second adversarial loss function.

Further, the model determining unit 10 is further configured to determine the first feature analysis model analyzing an output result of the first feature extraction module. The processing unit 12 is further configured to: determine the category of the machine-generated graphics in the training dataset according to the machine-generated graphics classification model to obtain a second category processing result, and analyze, according to the first feature analysis model, the feature of the machine-generated graphics extracted by the second feature extraction module, to obtain the second feature analysis result of the machine-generated graphics. The function value calculation unit 13 is further configured to calculate the function value of the second loss function of the machine-generated graphics classification model according to the second category processing result and the second feature analysis result of the machine-generated graphics. The second loss function includes a loss function related to the second classification module and a loss function by which the first feature analysis model analyzes the feature of the machine-generated graphics. The adjustment unit 14 is further configured to adjust the second model parameter values in the machine-generated graphics classification model according to the function value of the second loss function.

Further, the processing unit 12 is further configured to analyze, according to the first feature analysis model, the feature of the sketch extracted by the first feature extraction module to obtain a first feature analysis result of a sketch. The function value calculation unit 13 is further configured to calculate a function value of a first adversarial loss function of the first feature analysis model according to the first feature analysis result of the sketch and the second feature analysis result of the machine-generated graphics. The adjustment unit 14 is further configured to adjust model parameter values of the first feature analysis model according to the function value of the first adversarial loss function.

It can be learnt that in the apparatus according to this embodiment, the training dataset unit 11 selects the training dataset. The processing unit 12 determines the category of the sketch in the training dataset according to the sketch classification model to obtain the first category processing result, and analyzes, according to the second feature analysis model, the feature of the sketch extracted by a first feature extracting model to obtain an the second analysis result of the sketch. Then the function value calculation unit 13 obtains the function value of the first loss function according to the first category processing result and the second analysis result of the sketch. Finally the adjustment unit 14 adjusts the first model parameter values of the sketch classification model according to the function value of the first loss function. The processing unit 12 may further determine the category of the machine-generated graphics in the training dataset according to the machine-generated graphics classification model to obtain the second category processing result, and analyze, according to the first feature analysis model, the feature of the machine-generated graphics extracted by the second feature extraction module to obtain the second analysis result of the machine-generated graphics. Then the function value calculation unit 13 obtains the function value of the second loss function according to the second category processing result and the second analysis result of the machine-generated graphics. Finally the adjustment unit 14 adjusts the second model parameter values of the machine-generated graphics classification model according to the function value of the second loss function. In this way, reference will be made to not only a deviation for the classification model to classify a corresponding image, but also useful information of another classification model (such as a machine-generated graphics classification model) in a classification process when model parameter values of a certain classification model (such as the sketch classification model) is adjusted, that is, a feature analysis model (such as the second feature analysis model) analyzing a feature extracted by the feature extraction module in another classification model, to ensure more accurate classification calculation of the sketch classification model and the machine-generated graphics classification model after the adjustment.

Figure 8:
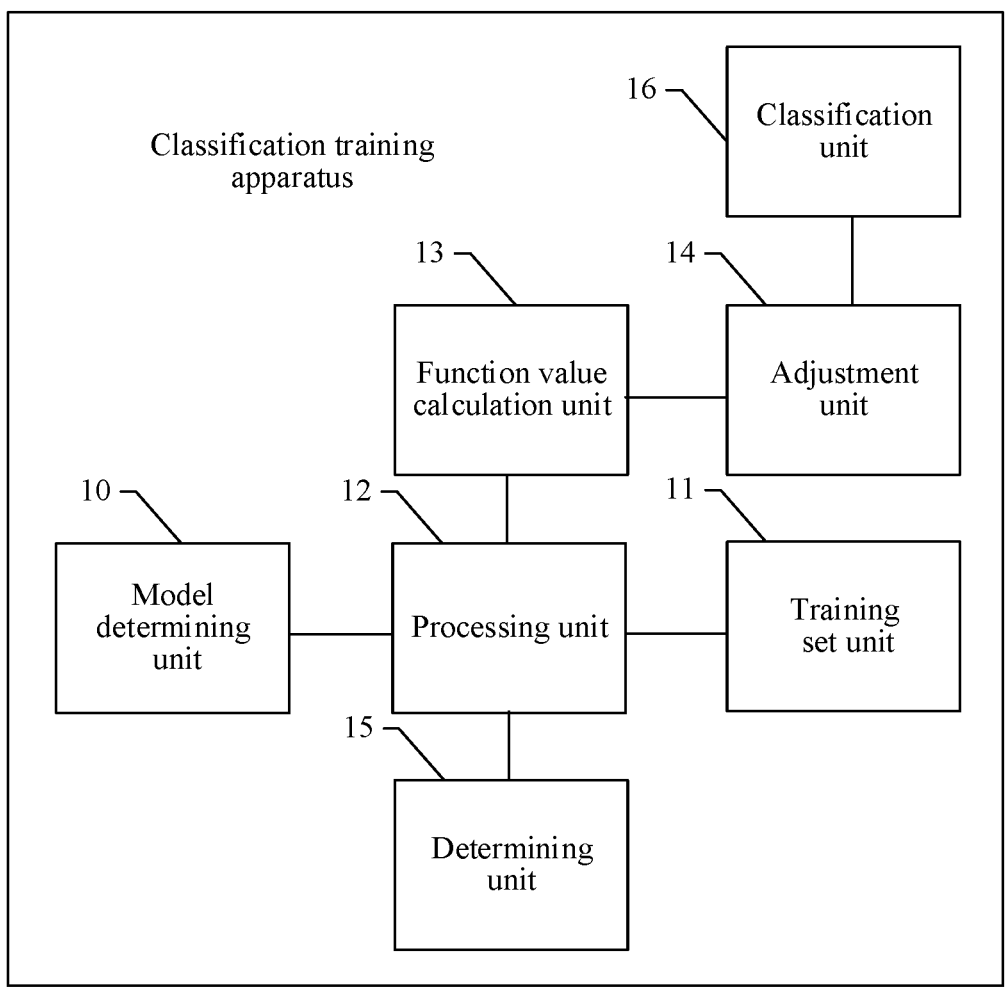
FIG. 8 is a block diagram of another classification model training apparatus according to an embodiment of this application.

Referring to FIG. 8, in a specific embodiment, the classification model training apparatus may further include a determining unit 15 and a classification unit 16 in addition to the structure shown in FIG. 7.

The determining unit 15 is configured to determine whether the adjustment of the adjustment unit 14 on the first model parameter values meets a preset stopping condition. If no, the processing unit 12 is notified to obtain the first category processing result and the second feature analysis result of the sketch for the sketch classification model whose first model parameter values is adjusted.

The preset stopping condition may include but is not limited to any one of the following conditions:

a first difference between the first model parameter values currently adjusted and the first model parameter values adjusted last time is less than a first threshold, the number of adjustment times to a first model parameter reach the preset number of times, and the like.

Further, the determining unit 15 is configured to determine whether the adjustment of the adjustment unit 14 on the second model parameter values meets the preset stopping condition. If no, the processing unit 12 is notified to obtain the second category processing result and the second feature analysis result of the machine-generated graphics for the machine-generated graphics classification model whose second model parameter value is adjusted. The preset stopping condition herein may include but is not limited to any one of the following conditions: the first difference between the second model parameter values currently adjusted and the second model parameter values adjusted last time is less than the first threshold, the number of adjustment times to the second model parameters reach the preset number of times, and the like.

The classification unit 16 is configured to: obtain a to-be-classified sketch and classify the to-be-classified sketch according to the sketch classification model adjusted by the adjustment unit 14 to obtain a category of the to-be-classified sketch.

The classification unit 16 may further obtain the to-be-classified sketch and obtain each machine-generated graphics stored in the classification model training apparatus; then classify the to-be-classified sketch according to the sketch classification model adjusted by the adjustment unit 14 to obtain the category of the to-be-classified sketch, and classify each stored machine-generated graphics separately according to the machine-generated graphics classification model after the adjustment to obtain the categories of the machine-generated graphics; and finally select a machine-generated graphics whose category is the same as that of the to-be-classified sketch.

Figure 9:
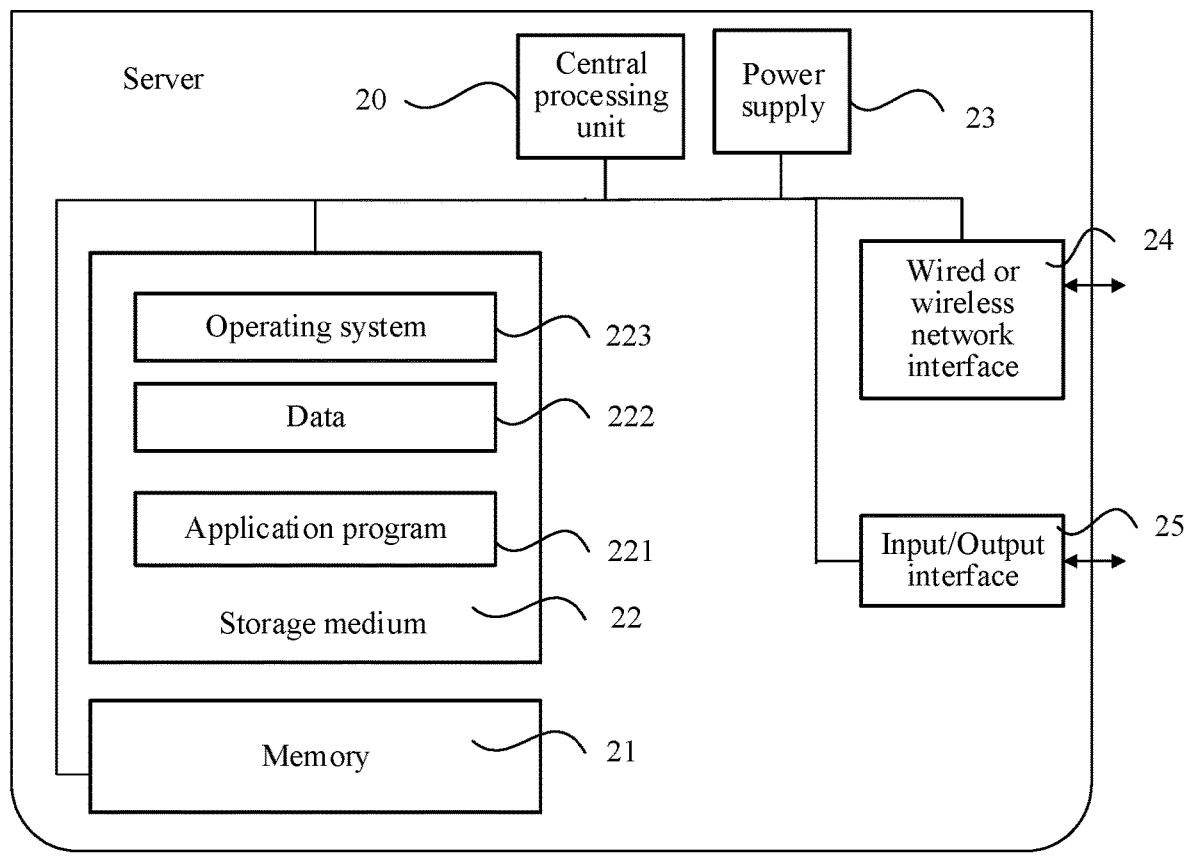
FIG. 9 is a block diagram of a server according to an embodiment of this application.

An embodiment of this application further provides a server. The schematic structural diagram is shown in FIG. 9. The server may produce larger difference due to different configuration or performance. The server may include one or more central processing units (CPU) 20 (such as one or more processors), one or more memories 21, one or more storage media 22 (such as one or more mass storage devices) storing application programs 221 or data 222. The memories 21 and the storage media 22 may temporarily or persistently store the application program 221 or the data 222. The program storing in the storage media 22 may include one or more modules (not shown in the FIG), and each module may include a series of computer readable instructions to the server. Further, the central processing units 20 may be disposed in communication with the storage media 22 and to implement the series of computer readable instructions in the storage media 22 on the server. When the computer readable instructions are being implemented, the one or more processors included in the central processing unit 20 may be enabled to perform a classification model training method. The storage media 22 may be non-volatile storage media. The non-volatile storage media may be non-volatile readable storage media.

Specifically, the application program 221 stored in the storage media 22 includes a classification model training application program. The program may include the model determining unit 10, the training dataset unit 11, the processing unit 12, the function value calculation unit 13, the adjustment unit 14, the determining unit 15, and the classification unit 16 in the classification model training apparatus, which is not described herein again. Further, the central processing units 20 may be disposed in communication with the storage media 22 and to perform a series of operations corresponding to the classification model training application program stored in the storage media 22 on the server.

The server may further include one or more power supplies 23, one or more wired or wireless network interfaces 24, one or more input/output interfaces 25, and/or one or more operating systems 223, such as Windows Server™, Mac OS X™, Unix™, Linux™, and FreeBSD™.

In the foregoing method embodiment, the step performed by the classification model training apparatus may be based on the structure of the server shown in FIG. 9. Each unit or module included in the classification model training apparatus may be wholly or partially implemented through software, hardware, or a combination thereof.

An embodiment of this application further provides a storage medium. The storage medium stores computer readable instructions. The computer readable instructions are loaded by a processor to perform the classification model training method according to the embodiments of this application.

An embodiment of this application further provides a server, including one or more processors and memories. The memories store computer readable instructions. The one or more processors are configured to implement each computer readable instruction. The computer readable instructions are configured to be loaded by the one or more processors to perform the classification model training method according to the embodiments of this application.

A person of ordinary skill in the art may understand that all or some steps in the methods of the foregoing embodiments may be implemented by a computer readable instruction instructing relevant hardware. The computer readable instruction may be stored in a computer readable storage medium. The storage medium may include: a read-only memory (ROM), a random access memory (RAM), a magnetic disk, an optical disk, or the like.

The technical features of the foregoing embodiments may be randomly combined. For the purpose of concise descriptions, not all possible combinations of the technical features in the foregoing embodiments are described, but as long as combinations of the technical features do not conflict each other, the combinations of the technical features should be considered as falling within the scope of this specification.

The foregoing embodiments briefly describe the classification model training method, server, and storage medium according to the embodiments of this application. The specification describes the principles and implementations of this application by using specific examples. The description of the foregoing embodiments are merely configured to help understanding the methods and core ideas of this application, but should not be understood as a limitation to the patent scope of the present disclosure. In addition, for a person of ordinary skill in the art, any change made to the specific embodiments and application ranges according to the idea of this application shall fall within the protection scope of this application. According to the above, the content of this specification should not be understood as a limitation to this application.

What is claimed is:

1. A classification model training method, comprising:
constructing, by a server, a sketch classification model, the sketch classification model for classifying input sketches into a plurality of categories, the sketch classification model comprising a first feature extraction module and a first classification module;
constructing, by the server, a second feature analysis model for analyzing an output result of a second feature extraction module to obtain a second sketch feature analysis result, the second feature extraction module being part of a machine-generated graphics classification model;
selecting, by the server, a training dataset, the training dataset comprising sketches of the plurality of categories;
determining, by the server, a category of a sketch in the training dataset according to the sketch classification model to obtain a first category processing result;
analyzing, according to the second feature analysis model, a feature of the sketch extracted by the first feature extraction module to obtain the second feature analysis result of the sketch;
calculating, by the server, a function value of a first loss function of the sketch classification model according to the first category processing result and the second feature analysis result of the sketch; and
adjusting, by the server, first model parameter values in the sketch classification model according to the function value of the first loss function.

2. The method according to claim 1, wherein the training dataset further comprises machine-generated graphics of the plurality of categories, and the method further comprises:
constructing, by the server, a machine-generated graphics classification model for classifying input machine-generated graphics into the plurality of categories, the machine-generated graphics classification model comprising the second feature extraction module and a second classification module;
analyzing, by the server according to the second feature analysis model, a feature of the machine-generated graphics extracted by the second feature extraction module when the machine-generated graphics classification model determines a category of the machine-generated graphics, to obtain a feature analysis result of a first machine-generated graphics;
calculating, by the server, a function value of a second adversarial loss function of the second feature analysis model according to the feature analysis result of the first machine-generated graphics and the second feature analysis result of the sketch; and
adjusting, by the server, model parameter values of the second feature analysis model according to the function value of the second adversarial loss function.

3. The method according to claim 1, further comprising:
obtaining, by the server, a to-be-classified sketch and classifying the to-be-classified sketch according to the sketch classification model after the adjustment to obtain a category of the to-be-classified sketch.

4. The method according to claim 2, wherein constructing, by the server, the sketch classification model and the machine-generated graphics classification model comprises:
determining, by the server, an initial model of a sketch classification and an initial model of a machine-generated graphics classification, and determining a sketch whose category has been marked and a machine-generated graphics whose category has been marked;

determining, by the server, a category of the sketch whose category has been marked according to the initial model of the sketch classification and a category of the machine-generated graphics whose category has been marked according to the initial model of the machine-generated graphics classification, to obtain an initial classification result; and calculating, by the server, a function value of a third loss function related to the initial model of the sketch classification and a function value of a fourth loss function related to the initial model of the machine-generated graphics classification according to the initial classification result, and adjusting the initial model of the sketch classification according to the function value of the third loss function and adjusting model parameter values in the initial model of the machine-generated graphics classification according to the function value of the fourth loss function, to obtain the sketch classification model and the machine-generated graphics classification model.

5. The method according to claim 2, further comprising:
constructing, by the server, a first feature analysis model for analyzing an output result of the first feature extraction module;

determining, by the server, a category of a machine-generated graphics in the training dataset according to the machine-generated graphics classification model to obtain a second category processing result; and analyzing, according to the first feature analysis model, a feature of the machine-generated graphics extracted by the second feature extraction module to obtain a second feature analysis result of the machine-generated graphics;

calculating, by the server, a function value of a second loss function of the machine-generated graphics classification model according to the second category processing result and the second feature analysis result of the machine-generated graphics; and adjusting, by the server, second model parameter values in the machine-generated graphics classification model according to the function value of the second loss function.

6. The method according to claim 2, further comprising:
returning, by the server for the sketch classification model whose first model parameter values are adjusted, the first category processing result obtained by determining, according to the sketch classification model, the category of the sketch in the training dataset to continue execution in a case that adjustment on the first model parameter values does not meet a preset stopping condition, until the adjustment on the first model parameter values meets the preset stopping condition.

7. The method according to claim 5, further comprising:
analyzing, by the server according to the first feature analysis model, a feature of the sketch extracted by the first feature extraction module to obtain a first feature analysis result of the sketch;

calculating, by the server, a function value of a first adversarial loss function of the first feature analysis model according to the first feature analysis result of the sketch and the second feature analysis result of the machine-generated graphics; and adjusting, by the server, model parameter values of the first feature analysis model according to the function value of the first adversarial loss function.

8. The method according to claim 6, wherein the preset stopping condition comprises any one of the following conditions:
a first difference between first model parameter values currently adjusted and first model parameter values adjusted last time is less than a first threshold; or
a number of adjustment times of the first model parameter values reaches a preset number of times.

9. A non-transitory storage medium for storing computer readable instructions, the computer readable instructions, when executed by a processor, cause the processor to:
construct a machine-generated graphics classification model for classifying input machine-generated graphics into a plurality of categories, the machine-generated graphics classification model comprising a second feature extraction module and a second classification module;

construct a sketch classification model for classifying input sketches into the plurality of categories, the sketch classification model comprising a first feature extraction module and a first classification module;

analyze, according to a second feature analysis model, a feature of the machine-generated graphics extracted by the second feature extraction module when the machine-generated graphics classification model determines a category of a first machine-generated graphics, to obtain a feature analysis result of the first machine-generated graphics;

calculate a function value of a second adversarial loss function of the second feature analysis model according to the feature analysis result of the first machine-generated graphics and a second feature analysis result of a sketch from the first feature extraction module; and adjust model parameter values of the second feature analysis model according to the function value of the second adversarial loss function.

10. The non-transitory storage medium according to claim 9, wherein the computer readable instructions, when executed by the processor to construct the sketch classification model and the machine-generated graphics classification model, cause the processor to:
determine an initial model of a sketch classification and an initial model of a machine-generated graphics classification, and determining a sketch whose category has been marked and a machine-generated graphics whose category has been marked;

determine a category of the sketch whose category has been marked according to the initial model of the sketch classification and a category of the machine-generated graphics whose category has been marked according to the initial model of the machine-generated graphics classification, to obtain an initial classification result; and calculate a function value of a third loss function related to the initial model of the sketch classification and a function value of a fourth loss function related to the initial model of the machine-generated graphics classification according to the initial classification result, and adjusting the initial model of the sketch classification according to the function value of the third loss function and adjusting model parameter values in the initial model of the machine-generated graphics classification according to the function value of the fourth loss function, to obtain the sketch classification model and the machine-generated graphics classification model.

11. The non-transitory storage medium according to claim 10, wherein the computer readable instructions, when executed by the processor, further cause the processor to:
   construct a first feature analysis model for analyzing output result of the first feature extraction module;
   determine a category of a machine-generated graphics in a training dataset according to the machine-generated graphics classification model to obtain a second category processing result; and analyzing, according to the first feature analysis model, a feature of the machine-generated graphics extracted by the second feature extraction module to obtain a second feature analysis result of the machine-generated graphics;
   calculate a function value of a second loss function of the machine-generated graphics classification model according to the second category processing result and the second feature analysis result of the machine-generated graphics; and
   adjust second model parameter values in the machine-generated graphics classification model according to the function value of the second loss function.

12. The non-transitory storage medium according to claim 10, wherein the computer readable instructions, when executed by the processor, further cause the processor to:
   analyze according to the first feature analysis model, a feature of the sketch extracted by the first feature extraction module to obtain a first feature analysis result of the sketch;
   calculate a function value of a first adversarial loss function of the first feature analysis model according to the first feature analysis result of the sketch and the second feature analysis result of the machine-generated graphics; and
   adjust model parameter values of the first feature analysis model according to the function value of the first adversarial loss function.

13. A server, comprising one or more processors and memories, the memories storing computer readable instructions, the processors being configured to execute the computer readable instructions to:
   construct a sketch classification model, the sketch classification model for classifying input sketches into a plurality of categories, the sketch classification model comprising a first feature extraction module and a first classification module;
   construct a second feature analysis model for analyzing an output result of a second feature extraction module a second sketch feature analysis result, the second feature extraction module being part of a machine-generated graphics classification model;
   select a training dataset, the training dataset comprising sketches of the plurality of categories;
   determine a category of a sketch in the training dataset according to the sketch classification model to obtain a first category processing result;
   analyze, according to the second feature analysis model, a feature of the sketch extracted by the first feature extraction module to obtain the second feature analysis result of the sketch;
   calculate a function value of a first loss function of the sketch classification model according to the first category processing result and the second feature analysis result of the sketch; and
   adjust first model parameter values in the sketch classification model according to the function value of the first loss function.

14. The server according to claim 13, wherein the training dataset further comprises machine-generated graphics of the plurality of categories, and the one or more processors are further configured to:
   construct a machine-generated graphics classification model, the machine-generated graphics classification model for classifying input machine-generated graphics into the plurality of categories, the machine-generated graphics classification model comprising the second feature extraction module and a second classification module;
   analyze, according to the second feature analysis model, a feature of the machine-generated graphics extracted by the second feature extraction module when the machine-generated graphics classification model determines a category of the machine-generated graphics, to obtain a feature analysis result of a first machine-generated graphics;
   calculating a function value of a second adversarial loss function of the second feature analysis model according to the feature analysis result of the first machine-generated graphics and the second feature analysis result of the sketch; and
   adjusting model parameter values of the second feature analysis model according to the function value of the second adversarial loss function.

15. The server according to claim 13, wherein the one or more processors are further configured to:
   return for the sketch classification model whose first model parameter values are adjusted, the first category processing result obtained by determining, according to the sketch classification model, the category of the sketch in the training dataset to continue execution in a case that adjustment on the first model parameter values does not meet a preset stopping condition, until the adjustment on the first model parameter values meets the preset stopping condition.

16. The server according to claim 13, wherein the one or more processors are further configured to:
   obtain a to-be-classified sketch and classifying the to-be-classified sketch according to the sketch classification model after the adjustment to obtain a category of the to-be-classified sketch.

17. The server according to claim 14, wherein to construct the sketch classification model and the machine-generated graphics classification model comprises:
   determine an initial model of a sketch classification and an initial model of a machine-generated graphics classification, and determining a sketch whose category has been marked and a machine-generated graphics whose category has been marked;
   determine a category of the sketch whose category has been marked according to the initial model of the sketch classification and a category of the machine-generated graphics whose category has been marked according to the initial model of the machine-generated graphics classification, to obtain an initial classification result; and
   calculate a function value of a third loss function related to the initial model of the sketch classification and a function value of a fourth loss function related to the initial model of the machine-generated graphics classification according to the initial classification result, and adjusting the initial model of the sketch classification according to the function value of the third loss function and adjusting model parameter values in the initial model of the machine-generated graphics classification according to the function value of the fourth loss function, to obtain the sketch classification model and the machine-generated graphics classification model.

18. The server according to claim 14, wherein the one or more processors are further configured to:
   construct a first feature analysis model for analyzing an output result of the first feature extraction module;
   determine a category of a machine-generated graphics in the training dataset according to the machine-generated graphics classification model to obtain a second category processing result; and analyzing, according to the first feature analysis model, a feature of the machine-generated graphics extracted by the second feature extraction module to obtain a second feature analysis result of the machine-generated graphics;
   calculate a function value of a second loss function of the machine-generated graphics classification model according to the second category processing result and the second feature analysis result of the machine-generated graphics; and
   adjust second model parameter values in the machine-generated graphics classification model according to the function value of the second loss function.

19. The server according to claim 15, wherein the preset stopping condition comprises any one of the following conditions:
   a first difference between first model parameter values currently adjusted and first model parameter values adjusted last time is less than a first threshold; or
   a number of adjustment times of the first model parameter values reaches a preset number of times.

20. The server according to claim 18, wherein the one or more processors are further configured to:
   analyze according to the first feature analysis model, a feature of the sketch extracted by the first feature extraction module to obtain a first feature analysis result of the sketch;
   calculate a function value of a first adversarial loss function of the first feature analysis model according to the first feature analysis result of the sketch and the second feature analysis result of the machine-generated graphics; and
   adjust the model parameter values of the first feature analysis model according to the function value of the first adversarial loss function.

* * * * *